Dec. 18, 1945.  J. E. SCHMIDT  2,391,351
APPARATUS FOR TESTING CANS FOR LEAKS
Filed Jan. 8, 1945  2 Sheets-Sheet 1
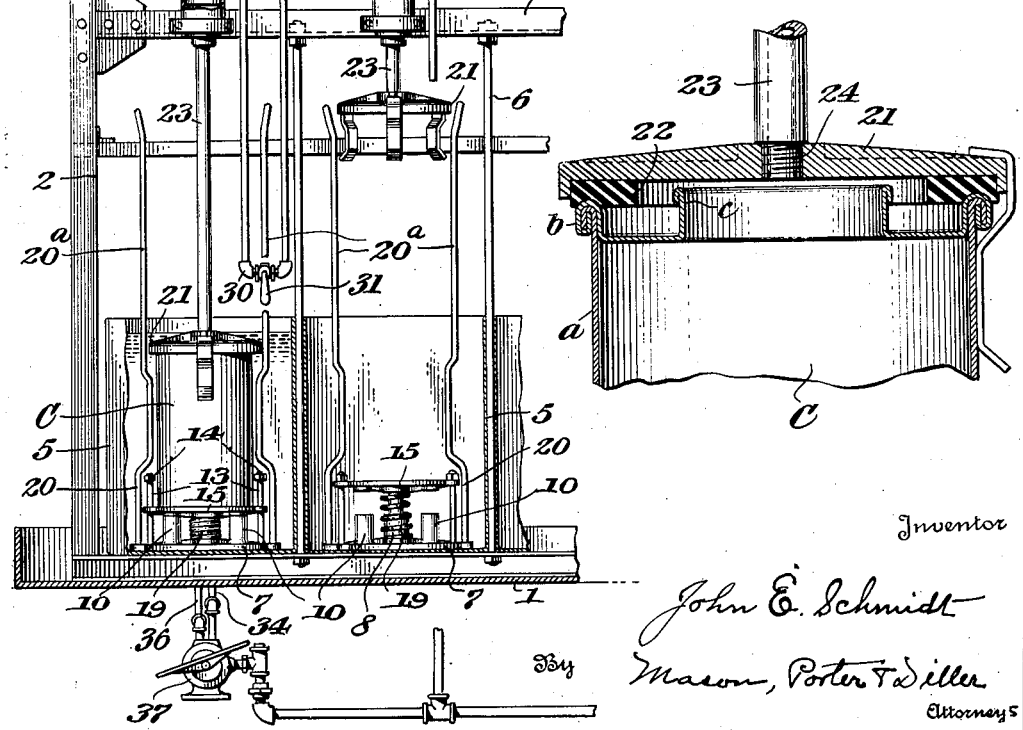
Fig. 1.
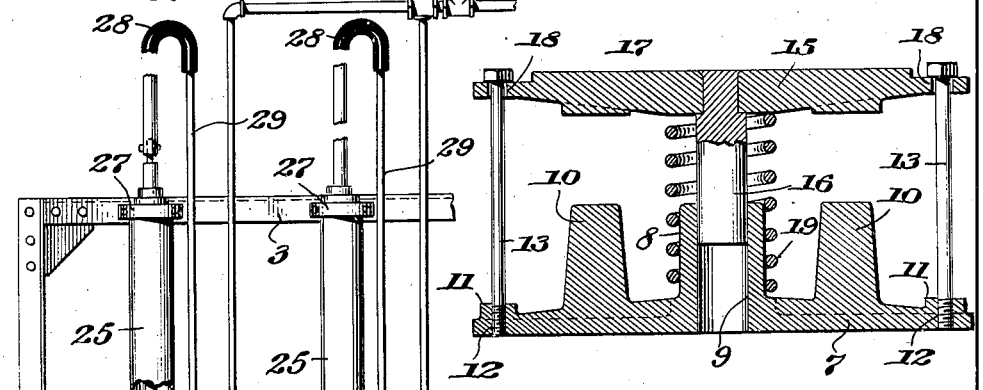
Fig. 4.
Fig. 5.
Inventor
John E. Schmidt
By Mason, Porter & Diller
Attorneys

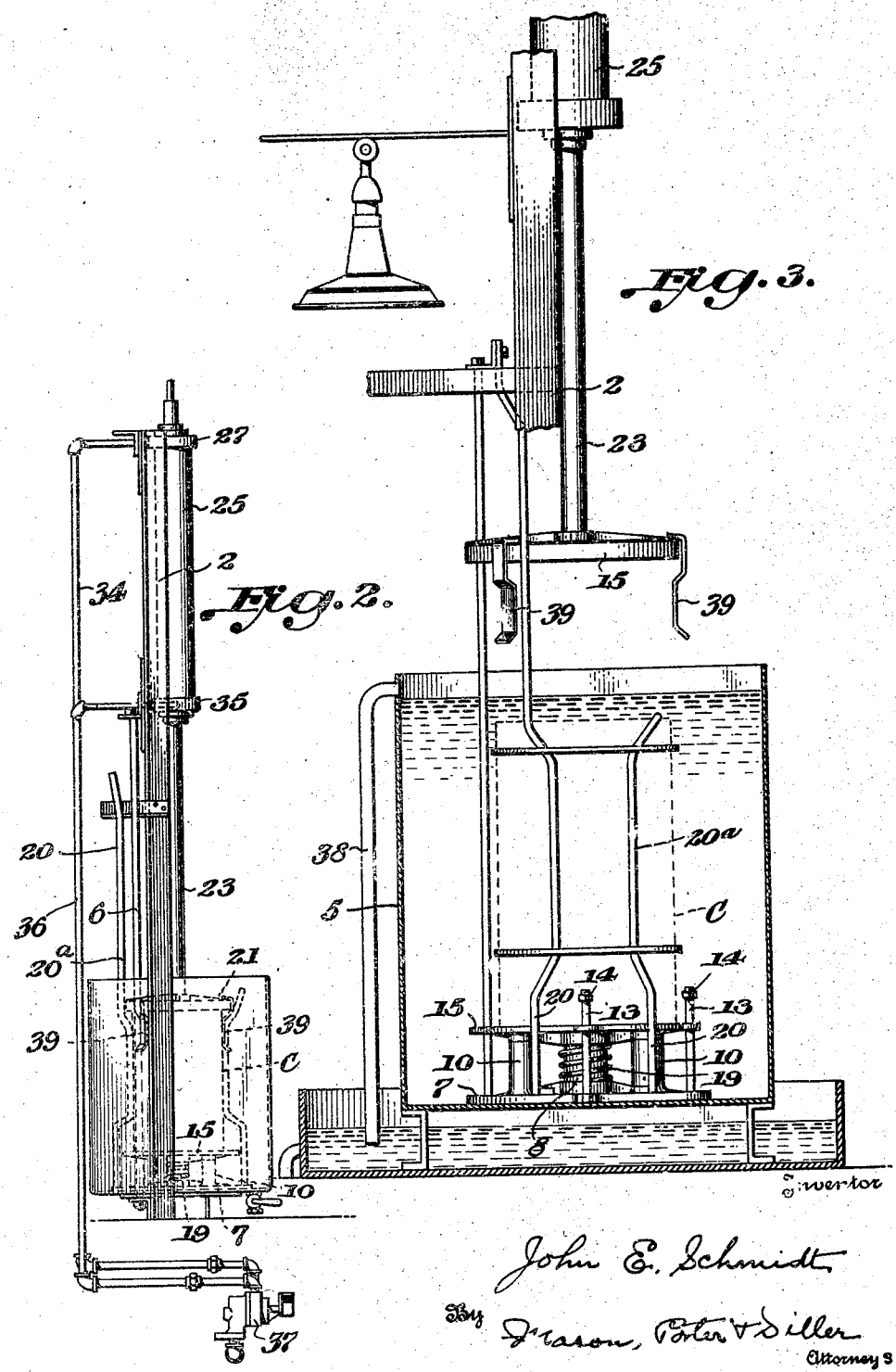

Patented Dec. 18, 1945

2,391,351

UNITED STATES PATENT OFFICE 2,391,351

APPARATUS FOR TESTING CANS FOR LEAKS

John E. Schmidt, Oak Park, Ill., assignor to Continental Can Company, Inc., New York, N. Y., a corporation of New York Application January 8, 1945, Serial No. 571,823

5 Claims. (Cl. 73—40)

The invention has to do with an apparatus for testing cans and more particularly large cans having a capacity of ten gallons or the like.

An object of the invention is to provide an apparatus for testing cans for leaks wherein the can is temporarily closed and forced beneath the surface of a water bath against the resistance of a can support which maintains the can in tight sealed contact with the closing means.

A further object of the invention is to provide an apparatus of the above type wherein a fluid operated piston is utilized for forcing the can beneath the surface of the water bath.

A further object of the invention is to provide stop means for limiting the downward movement of the can support after the can has been wholly submerged so that the can may be held positively closed during admission of air under pressure for testing the same.

A still further object of the invention is to provide an apparatus of the above type wherein the air under pressure is admitted to the can through the hollow piston of the fluid actuated means for closing and immersing the can in the water bath.

These and other objects will in part be obvious and will in part be hereinafter more fully disclosed.

In the drawings which show by way of illustration one embodiment of the invention—

Figure 1 is a view partly in front elevation and partly in section showing two units of a bank of testing devices;

Figure 2 is a side view of one of the units;

Figure 3 is an enlarged view of one of the testing units, said view being restricted to the tank and the parts immediately associated therewith;

Figure 4 is a vertical sectional view showing the can support and a means of yieldingly mounting the same at the bottom of the testing tank;

Figure 5 is a vertical sectional view of the closing head showing its connection to the hollow piston.

A great deal of difficulty has been experienced in testing large cans such as ten-gallon cans or the like for leaks, due to the fact that when the can is temporarily closed it is not easy to submerge a can of such capacity beneath the surface of a water bath for the testing of the same. The apparatus embodying the invention utilizes a fluid actuated piston for forcing the can beneath the surface of the water bath for the testing of the same. The can is placed on a yieldingly mounted support. Guides are provided for directing the can onto the support and when the can contacts with the support the open end is slightly above the surface of the bath. A closure pad hydraulically moved downward contacts with the open end of the can and closes the same, after which the can is forced beneath the surface of the bath, the support on which the can is mounted yieldingly resisting the downward pressure of the hydraulic operated pad.

After the can is completely submerged, air under pressure is directed into the can through the piston of the hydraulic device. If there is a leak in the can seams the air will escape through the leak and rise in bubbles in the bath, indicating that the can is defective. After testing, the fluid operated piston which moves the can beneath the surface of the bath, is operated in the reverse direction so as to permit the can to be removed from the bath. On the upward movement of the piston the support will hold the can tight against the pad until the upper end of the can is above the surface of the bath. Then the piston moves away from the can and permits the operator to lift the can from the apparatus.

Referring more in detail to the drawings, the improved apparatus includes a series of testing units. In the drawings two of these testing units have been shown. The testing units are all alike and the description of one will answer for the others.

These testing units are mounted in a frame which includes a base member 1, end members 2 and cross members 3 and 4. These parts are preferably made of angle iron secured together in the usual manner. Mounted on the supporting base is a tank 5. There is a separate tank for each testing unit. Between the tanks are supporting members 6 which extend from the base member to the cross frame 4.

Disposed within the tank is a supporting bracket 7, which bracket is secured in any suitable way to the base proper of the apparatus. This supporting bracket 7 has a central sleeve 8 provided with a bore 9 therethrough. Also mounted on this bracket are solid stops 10, 10, preferably four in number. The bracket is provided with a boss 11 which has a bore therethrough indicated at 12. This bore is threaded and a rod 13 is secured thereto. There are four of these rods, and on the upper end of each rod is a nut 14.

Mounted on this bracket is a can support 15. This can support has a depending stud 16 which fits within the bore 9 so that the support 15 can move up and down relative to the bracket 7. This support for the can body has a central raised section 17 which serves to center the can by entering the depression in the bottom of the can. The support 15 is provided with openings 18 through which the rods 13 pass. Surrounding the sleeve 8 is a spring 19. This spring normally raises the support 15 until the support contacts with the nuts 14 on the ends of the rods 13. The support is shown as raised in Figure 1 in the unit illustrated at the right thereof.

Mounted in the base member are guide rods 20. There are four of these guide rods and these rods are secured to the base outside of the bracket. The rods extend upwardly to a point above the nuts 14 on the rods 13 and are thence bent inwardly so that the four rods are spaced so as to contact with the can body and center it on the support 15. These rods adjacent the upper end of the can body, when fully immersed in the bath, are bent outwardly to give sufficient room for the sealing pad which closes the can. Three of the rods, one at the rear and the two at the sides, are extended upwardly as indicated at 20a and the upper ends thereof are flared outwardly to ensure the movement of the closing pad inbetween the rods.

The pad for closing the can for testing is shown in detail in Figure 5 and is indicated therein at 21. Said pad includes a metal part having a recess in its under face. A rubber ring 22 is inserted in this recess. The ring projects below the lower face of the pad and is adapted to engage the double seam. The can is shown at $a$. The can end is secured to the can body by a double seam $b$. The can has a neck portion $c$ which is adapted to be closed by a friction plug, or the neck portion may be provided with a flange and an end double seamed thereto for closing. The rubber ring engages the double seam and the neck portion extends up into the opening in the ring. The pad has a threaded opening 24 and a hollow piston 23 is threaded into the opening and air is directed through the hollow piston into the can for testing purposes.

Mounted above the cross partition 4 is a cylinder 25. In this cylinder 25 is a piston 26. The hollow piston rod 23 extends through the piston 26 and all the way up through the cylinder 25 and out through a suitable packing in the upper head 27 of the cylinder 25. A flexible hose 28 is attached to the upper end of the hollow piston. It is also attached to a pipe 29 which extends downward to a control head 30 in which there is a hand-operated valve 31. From this control head 30 a pipe 32 leads to a tank 33 in which air is stored under relatively low pressure.

The cylinder 25 is mounted on the cross frames 3 and 4. There is a port in the upper cylinder head 27 to which a pipe 34 is connected. There is also a port in the lower cylinder head 35 to which a pipe 36 is connected. These two pipes 34 and 36 lead to a valve casing 37 which is provided with a valve that may be controlled by the foot. When the valve is turned to one set position a fluid under pressure is directed to one side of the piston head for moving the piston head downward and when it is moved to another set position, fluid is directed to the other side of the piston for moving it in a reverse direction. When one side of the piston is subjected to pressure, the other side is connected to an exhaust. This valve control by the foot is of the usual reversing type of valve for a fluid operated piston.

The units are each individually operated. The foot valve is positioned so that the piston is raised as shown at the right in Figure 1. At this time the support 15 is in its raised position. The operator places the can underneath the closing pad 21 and between the upper sections 20a of the guide rods. The front guide rod is shortened as shown in the drawings so that the can can be placed between the side rods and against the rear rod. The foot valve is then shifted so that the pad is lowered into engagement with the open end of the can top. This pad contacting with the flange of the can body will close the can. The pad on its continued downward movement will force the can between the guides 20 down into the water bath and onto the can support 15. At this time the upper end of the can is well above the level of the water bath. Further downward movement of the pad 21 under the fluid actuated piston will move the support 15 downward against the resistance of the spring 19. When the support contacts with the stops 10, 10 the water level is then well above the upper end of the can.

There is an overflow pipe 38 connected to the tank so that the water does not overflow the upper end of the tank. The pad when it is moved into contact with the open end of the can, centers the can on the pad by the aid of guiding devices indicated at 39. There are preferably four of these guiding devices. They are carried by and moved with the pad. The lower ends of these guiding devices are tapered outwardly so as to ensure that the can will enter between the guiding devices.

After the can has been fully immersed in the water bath, the hand-operated valve 31 is turned so as to admit air under pressure through the pipe 29, the flexible pipe 28, and the hollow piston, into the can. If there is a leak in any of the seams of the can air introduced into the can under pressure will pass out through the leak into the water bath and rise to the surface of the water bath in the form of bubbles. At the time of testing, the fluid pressure on the upper side of the piston will hold the pad pressed against the can and the can pressed against the support therefor, and the support for the can in contact with the stops so that the joint between the rubber ring on the pad and the end seam of the can is very tight and the air under pressure cannot escape through this joint.

Lights are provided in the bath at the bottom of the tank for enabling the operator to quickly see any bubbles forming and rising to the surface of the bath. After the testing is completed the foot valve is shifted so as to admit air under pressure to the under side of the piston 26. As the piston moves upwardly the support 15 will be raised by the spring and hold the can in tight contact with the pad until the support 15 contacts with the nuts 14. Then the support cannot move upwardly any further and the pad will move away from the upper end of the can to the upper end of its stroke, as shown in Figure 1 at the right. The operator then lifts the can from the bath and removes it from the apparatus. If there were bubbles coming to the surface of the bath during testing, this indicated a defective can and it was laid aside as such. The testing in this apparatus indicates whether the can is imperfect but does not indicate, with any certainty, where the leak occurred.

While the apparatus has been described as used in testing a large can which is to be closed by a friction plug, it will be understood that the neck portion of the can may be provided with a flange and a closure end secured thereto by a double seam. The method of testing would be precisely the same as with the friction plug closure type of can.

As has already been noted, the valve 31 is operated manually and is preferably opened to permit air under low pressure into the can after the can is immersed in the water and held rigidly clamped against the support resting on the stops by the fluid pressure against the pad which closes the can. After the testing operation is completed the valve 31 is turned so as to cut off the air pressure within the can and connect the same to the atmosphere so that when the can is raised from the water bath, it will not bulge.

It is obvious that many changes in the details of construction may be made without departing from the spirit of the invention as set forth in the appended claims.

I claim:

1. An apparatus for testing cans for leaks comprising a tank adapted to contain a water bath, guides therein for directing the can into and out of the water bath, a yieldingly mounted can support disposed upon the bottom of the tank between the guides, a pad for closing the upper end of the can, hydraulic means for moving said pad into engagement with a can disposed in said guides for forcing the can beneath the surface of the bath against the resistance of the yielding support, and means for supplying air under pressure to the can.

2. An apparatus for testing cans for leaks comprising a tank adapted to contain a water bath, guides therein for directing the can into and out of the water bath, a yieldingly mounted can support disposed upon the bottom of the tank between the guides, a pad for closing the upper end of the can, stops for limiting the downward movement of the can support, hydraulic means for moving said pad into engagement with a can disposed in said guides for forcing the can beneath the surface of the bath against the resistance of the yielding support, and means for supplying air under pressure to the can.

3. An apparatus for testing cans for leaks comprising a tank adapted to contain a water bath, guides therein for directing a can into and out of the water bath, a bracket member at the bottom of the tank within said guides, a can support having a sliding connection with said bracket, a spring disposed between said support and the bracket for raising the support, means for limiting the upward movement of the support, a pad for closing the open upper end of the can, hydraulic means for moving said pad into engagement with a can disposed in said guides for forcing the can on the support beneath the surface of the bath against the resistance of the spring beneath the support and means for supplying air under pressure to the can.

4. An apparatus for testing cans for leaks comprising a tank adapted to contain a water bath, guides therein for directing a can into and out of the water bath, a bracket member at the bottom of the tank within said guides, a can support having a sliding connection with said bracket, a spring disposed between said support and the bracket for raising the support, means for limiting the upward movement of the support, a pad for closing the open upper end of the can, hydraulic means for moving said pad into engagement with a can disposed in said guides for forcing the can on the support beneath the surface of the bath against the resistance of the spring beneath the support, stops for limiting the downward movement of the support under pressure applied to the pad and means for supporting air under pressure to the can.

5. An apparatus for testing cans for leaks comprising a tank adapted to contain a water bath, guides therein for directing a can into and out of the water bath, a yieldingly mounted can support disposed upon the bottom of the tank between the guides, a pad having a sealing member for closing the open upper end of the can, a cylinder above said pad, a piston in said cylinder, a hollow piston rod connected with the piston and with the pad, said hollow piston rod being extended through the piston head and out of the cylinder, means for admitting fluid into said cylinder for moving the pad downward into engagement with the can for closing the can and for forcing the can beneath the surface of the bath against the resistance of the yielding support and means for supplying air under pressure through the hollow piston into said can for testing the same for leaks.

JOHN E. SCHMIDT.